(12) United States Patent
Maier et al.

(10) Patent No.: US 8,876,389 B2
(45) Date of Patent: Nov. 4, 2014

(54) SEGMENTED COAST-DOWN BEARING FOR MAGNETIC BEARING SYSTEMS

(75) Inventors: Martin D. Maier, Allegany, NY (US); H. Allan Kidd, Vero Beach, FL (US)

(73) Assignee: Dresser-Rand Company, Olean, NY (US)

(*) Notice: Subject to any disclaimer, the term of this patent is extended or adjusted under 35 U.S.C. 154(b) by 0 days.

(21) Appl. No.: 14/122,241

(22) PCT Filed: Mar. 30, 2012

(86) PCT No.: PCT/US2012/031345
§ 371 (c)(1),
(2), (4) Date: Apr. 2, 2014

(87) PCT Pub. No.: WO2012/166236
PCT Pub. Date: Dec. 6, 2012

(65) Prior Publication Data
US 2014/0205223 A1    Jul. 24, 2014

Related U.S. Application Data

(60) Provisional application No. 61/490,897, filed on May 27, 2011.

(51) Int. Cl.
*F16C 32/04* (2006.01)
*F16C 41/04* (2006.01)

(52) U.S. Cl.
CPC ............. *F16C 32/0406* (2013.01); *F16C 41/04* (2013.01)
USPC .......................................... 384/114; 384/118

(58) Field of Classification Search
USPC .................................................. 384/114, 118
See application file for complete search history.

(56) References Cited

U.S. PATENT DOCUMENTS

| 5,191,811 A | 3/1993 | Kogure |
| 5,201,587 A | 4/1993 | Springer |
| 5,202,024 A | 4/1993 | Andersson et al. |
| 5,202,026 A | 4/1993 | Lema |
| 5,203,891 A | 4/1993 | Lema |
| 5,207,810 A | 5/1993 | Sheth |
| 5,211,427 A | 5/1993 | Washizu |
| 5,215,384 A | 6/1993 | Maier |
| 5,215,385 A | 6/1993 | Ide |
| 5,219,232 A | 6/1993 | Adams et al. |

(Continued)

FOREIGN PATENT DOCUMENTS

| CA | 2 647 511 | 10/2007 |
| DE | 44 19 364 A1 | 12/1995 |

(Continued)

OTHER PUBLICATIONS

Atlas Bronze, "Copper Alloys, Iron Alloys," Brochure, 2 pages.

(Continued)

*Primary Examiner* — Thomas R. Hannon
(74) *Attorney, Agent, or Firm* — Edmonds & Nolte, PC

(57) ABSTRACT

Coast-down bearing apparatus and methods are provided. The coast-down bearing includes a plurality of segments each having a radius of curvature substantially equal to an outer radius of a shaft and spaced radially therefrom to define a clearance, with the plurality of segments being configured to receive the shaft when a magnetic bearing drops the shaft. The coast-down bearing also includes a plurality of slots disposed between adjacent ones of the plurality of segments.

17 Claims, 3 Drawing Sheets

(56) References Cited

U.S. PATENT DOCUMENTS

| | | |
|---|---|---|
| 5,231,323 A | 7/1993 | New |
| 5,246,346 A | 9/1993 | Schiesser |
| 5,251,985 A | 10/1993 | Monzel |
| 5,267,798 A | 12/1993 | Budris |
| 5,272,403 A | 12/1993 | New |
| 5,273,249 A | 12/1993 | Peterson et al. |
| 5,285,123 A | 2/1994 | Kataoka et al. |
| 5,302,091 A | 4/1994 | Horiuchi |
| 5,306,051 A | 4/1994 | Loker et al. |
| 5,310,311 A | 5/1994 | Andres et al. |
| 5,311,432 A | 5/1994 | Momose |
| 5,337,779 A | 8/1994 | Fukuhara |
| 5,340,272 A | 8/1994 | Fehlau |
| 5,341,527 A | 8/1994 | Schmidt et al. |
| 5,345,127 A | 9/1994 | New |
| 5,347,190 A | 9/1994 | Lewis et al. |
| 5,355,040 A | 10/1994 | New |
| 5,355,042 A | 10/1994 | Lewis et al. |
| 5,356,226 A | 10/1994 | Onishi et al. |
| 5,378,121 A | 1/1995 | Hackett |
| 5,385,446 A | 1/1995 | Hays |
| 5,403,019 A | 4/1995 | Marshall |
| 5,421,655 A | 6/1995 | Ide et al. |
| 5,421,708 A | 6/1995 | Utter |
| 5,425,345 A | 6/1995 | Lawrence et al. |
| 5,425,584 A | 6/1995 | Ide |
| 5,427,455 A | 6/1995 | Bosley |
| 5,443,581 A | 8/1995 | Malone |
| 5,445,013 A | 8/1995 | Clayton, Jr. et al. |
| 5,484,521 A | 1/1996 | Kramer |
| 5,494,448 A | 2/1996 | Johnson et al. |
| 5,495,221 A | 2/1996 | Post |
| 5,496,394 A | 3/1996 | Nied |
| 5,500,039 A | 3/1996 | Mori et al. |
| 5,509,782 A | 4/1996 | Streeter |
| 5,514,924 A | 5/1996 | McMullen et al. |
| 5,521,448 A | 5/1996 | Tecza et al. |
| 5,525,034 A | 6/1996 | Hays |
| 5,525,146 A | 6/1996 | Straub |
| 5,531,811 A | 7/1996 | Kloberdanz |
| 5,538,259 A | 7/1996 | Uhrner et al. |
| 5,542,831 A | 8/1996 | Scarfone |
| 5,547,287 A | 8/1996 | Zeidan |
| 5,575,309 A | 11/1996 | Connell |
| 5,585,000 A | 12/1996 | Sassi |
| 5,593,232 A | 1/1997 | Maier |
| 5,601,155 A | 2/1997 | Gardner |
| 5,605,172 A | 2/1997 | Schubert et al. |
| 5,616,976 A | 4/1997 | Fremerey et al. |
| 5,628,623 A | 5/1997 | Skaggs |
| 5,630,881 A | 5/1997 | Ogure et al. |
| 5,634,492 A | 6/1997 | Steinruck et al. |
| 5,640,472 A | 6/1997 | Meinzer et al. |
| 5,641,280 A | 6/1997 | Timuska |
| 5,642,944 A | 7/1997 | Dublin, Jr. |
| 5,645,399 A | 7/1997 | Angus |
| 5,651,616 A | 7/1997 | Hustak et al. |
| 5,653,347 A | 8/1997 | Larsson |
| 5,664,420 A | 9/1997 | Hays |
| 5,669,717 A | 9/1997 | Kostrzewsky |
| 5,682,759 A | 11/1997 | Hays |
| 5,683,185 A | 11/1997 | Buse |
| 5,683,235 A | 11/1997 | Welch |
| 5,685,691 A | 11/1997 | Hays |
| 5,687,249 A | 11/1997 | Kato |
| 5,693,125 A | 12/1997 | Dean |
| 5,693,994 A | 12/1997 | New |
| 5,703,424 A | 12/1997 | Dorman |
| 5,709,528 A | 1/1998 | Hablanian |
| 5,713,720 A | 2/1998 | Barhoum |
| 5,714,818 A | 2/1998 | Eakman et al. |
| 5,720,799 A | 2/1998 | Hays |
| 5,738,356 A | 4/1998 | Marshall |
| 5,738,445 A | 4/1998 | Gardner |
| 5,743,654 A | 4/1998 | Ide et al. |
| 5,749,700 A | 5/1998 | Henry et al. |
| 5,750,040 A | 5/1998 | Hays |
| 5,752,774 A | 5/1998 | Heshmat et al. |
| 5,759,011 A | 6/1998 | Moll |
| 5,775,882 A | 7/1998 | Kiyokawa et al. |
| 5,779,619 A | 7/1998 | Borgstrom et al. |
| 5,791,868 A | 8/1998 | Bosley et al. |
| 5,795,135 A | 8/1998 | Nyilas et al. |
| 5,797,990 A | 8/1998 | Li |
| 5,800,092 A | 9/1998 | Nill et al. |
| 5,803,612 A | 9/1998 | Bättig |
| 5,810,485 A | 9/1998 | Dublin, Jr. |
| 5,810,558 A | 9/1998 | Streeter |
| 5,827,040 A | 10/1998 | Bosley et al. |
| 5,848,616 A | 12/1998 | Vogel et al. |
| 5,850,857 A | 12/1998 | Simpson |
| 5,853,585 A | 12/1998 | Nesseth |
| 5,863,023 A | 1/1999 | Evans et al. |
| 5,866,518 A | 2/1999 | Dellacorte et al. |
| 5,899,435 A | 5/1999 | Mitsch et al. |
| 5,927,720 A | 7/1999 | Zinsmeyer et al. |
| 5,935,053 A | 8/1999 | Strid |
| 5,938,803 A | 8/1999 | Dries |
| 5,938,819 A | 8/1999 | Seery |
| 5,946,915 A | 9/1999 | Hays |
| 5,948,030 A | 9/1999 | Miller et al. |
| 5,951,066 A | 9/1999 | Lane et al. |
| 5,957,656 A | 9/1999 | De Long |
| 5,965,022 A | 10/1999 | Gould |
| 5,967,746 A | 10/1999 | Hagi et al. |
| 5,971,702 A | 10/1999 | Afton et al. |
| 5,971,907 A | 10/1999 | Johannemann et al. |
| 5,977,677 A | 11/1999 | Henry et al. |
| 5,980,218 A | 11/1999 | Takahashi et al. |
| 5,988,524 A | 11/1999 | Odajima et al. |
| 6,011,829 A | 1/2000 | Panasik |
| 6,035,934 A | 3/2000 | Stevenson et al. |
| 6,036,435 A | 3/2000 | Oklejas |
| 6,059,539 A | 5/2000 | Nyilas et al. |
| 6,068,447 A | 5/2000 | Foege |
| 6,078,120 A | 6/2000 | Casaro et al. |
| 6,090,174 A | 7/2000 | Douma et al. |
| 6,090,299 A | 7/2000 | Hays et al. |
| 6,095,690 A | 8/2000 | Niegel |
| 6,111,333 A | 8/2000 | Takahashi et al. |
| 6,113,675 A | 9/2000 | Branstetter |
| 6,122,915 A | 9/2000 | Hays |
| 6,123,363 A | 9/2000 | Burgard et al. |
| 6,135,639 A | 10/2000 | Dede |
| 6,145,844 A | 11/2000 | Waggott |
| 6,149,825 A | 11/2000 | Gargas |
| 6,151,881 A | 11/2000 | Ai et al. |
| 6,155,720 A | 12/2000 | Bättig |
| 6,191,513 B1 | 2/2001 | Chen et al. |
| 6,194,801 B1 | 2/2001 | Göransson |
| 6,196,809 B1 | 3/2001 | Takahashi et al. |
| 6,196,962 B1 | 3/2001 | Purvey et al. |
| 6,206,202 B1 | 3/2001 | Galk et al. |
| 6,214,075 B1 | 4/2001 | Filges et al. |
| 6,217,637 B1 | 4/2001 | Toney et al. |
| 6,227,379 B1 | 5/2001 | Nesseth |
| 6,232,688 B1 | 5/2001 | Ress, Jr. et al. |
| 6,244,749 B1 | 6/2001 | Nakagawa et al. |
| 6,255,752 B1 | 7/2001 | Werner |
| 6,277,278 B1 | 8/2001 | Conrad et al. |
| 6,309,174 B1 | 10/2001 | Oklejas, Jr. et al. |
| 6,310,414 B1 | 10/2001 | Agahi et al. |
| 6,312,021 B1 | 11/2001 | Thomas |
| 6,314,738 B1 | 11/2001 | Hays |
| 6,353,272 B1 | 3/2002 | van der Hoeven |
| 6,353,273 B1 | 3/2002 | Heshmat et al. |
| 6,367,241 B1 | 4/2002 | Ress, Jr. et al. |
| 6,372,006 B1 | 4/2002 | Pregenzer et al. |
| 6,375,437 B1 | 4/2002 | Nolan |
| 6,383,262 B1 | 5/2002 | Marthinsen et al. |
| 6,390,789 B1 | 5/2002 | Grob et al. |
| 6,394,764 B1 | 5/2002 | Samurin |
| 6,398,400 B1 | 6/2002 | Nienhaus |
| 6,398,973 B1 | 6/2002 | Saunders et al. |

(56) References Cited

U.S. PATENT DOCUMENTS

| | | |
|---|---|---|
| 6,402,385 B1 | 6/2002 | Hayakawa et al. |
| 6,402,465 B1 | 6/2002 | Maier |
| 6,426,010 B1 | 7/2002 | Lecoffre et al. |
| 6,464,469 B1 | 10/2002 | Grob et al. |
| 6,467,988 B1 | 10/2002 | Czachor et al. |
| 6,468,426 B1 | 10/2002 | Klass |
| 6,485,536 B1 | 11/2002 | Masters |
| 6,530,484 B1 | 3/2003 | Bosman |
| 6,530,979 B2 | 3/2003 | Firey |
| 6,531,066 B1 | 3/2003 | Saunders et al. |
| 6,537,035 B2 | 3/2003 | Shumway |
| 6,540,917 B1 | 4/2003 | Richards et al. |
| 6,547,037 B2 | 4/2003 | Kuzdzal |
| 6,592,654 B2 | 7/2003 | Brown |
| 6,596,046 B2 | 7/2003 | Conrad et al. |
| 6,599,086 B2 | 7/2003 | Soja |
| 6,607,348 B2 | 8/2003 | Jean |
| 6,609,882 B2 | 8/2003 | Urlichs |
| 6,616,719 B1 | 9/2003 | Sun et al. |
| 6,617,731 B1 | 9/2003 | Goodnick |
| 6,617,733 B1 | 9/2003 | Yamauchi et al. |
| 6,629,825 B2 | 10/2003 | Stickland et al. |
| 6,631,617 B1 | 10/2003 | Dreiman et al. |
| 6,637,942 B2 | 10/2003 | Dourlens et al. |
| 6,658,986 B2 | 12/2003 | Pitla et al. |
| 6,659,143 B1 | 12/2003 | Taylor et al. |
| 6,666,134 B2 | 12/2003 | Gusching et al. |
| 6,669,845 B2 | 12/2003 | Klass |
| 6,688,802 B2 | 2/2004 | Ross et al. |
| 6,707,200 B2 | 3/2004 | Carroll et al. |
| 6,718,955 B1 | 4/2004 | Knight |
| 6,719,830 B2 | 4/2004 | Illingworth et al. |
| 6,764,284 B2 | 7/2004 | Oehman, Jr. |
| 6,770,993 B1 | 8/2004 | Heshmat et al. |
| 6,776,812 B2 | 8/2004 | Komura et al. |
| 6,802,693 B2 | 10/2004 | Reinfeld et al. |
| 6,802,881 B2 | 10/2004 | Illingworth et al. |
| 6,810,311 B2 | 10/2004 | Winner et al. |
| 6,811,713 B2 | 11/2004 | Arnaud |
| 6,817,846 B2 | 11/2004 | Bennitt |
| 6,837,913 B2 | 1/2005 | Schilling et al. |
| 6,843,836 B2 | 1/2005 | Kitchener |
| 6,846,158 B2 | 1/2005 | Hull |
| 6,878,187 B1 | 4/2005 | Hays et al. |
| 6,893,208 B2 | 5/2005 | Frosini et al. |
| 6,907,933 B2 | 6/2005 | Choi et al. |
| 6,957,945 B2 | 10/2005 | Tong et al. |
| 6,966,746 B2 | 11/2005 | Cardenas et al. |
| 6,979,358 B2 | 12/2005 | Ekker et al. |
| 6,987,339 B2 | 1/2006 | Adams et al. |
| 7,001,448 B1 | 2/2006 | West |
| 7,004,719 B2 | 2/2006 | Baldassarre et al. |
| 7,013,978 B2 | 3/2006 | Appleford et al. |
| 7,018,104 B2 | 3/2006 | Dourlens et al. |
| 7,022,150 B2 | 4/2006 | Borgstrom et al. |
| 7,022,153 B2 | 4/2006 | McKenzie |
| 7,025,890 B2 | 4/2006 | Moya |
| 7,033,410 B2 | 4/2006 | Hilpert et al. |
| 7,033,411 B2 | 4/2006 | Carlsson et al. |
| 7,048,495 B2 | 5/2006 | Osgood |
| 7,056,363 B2 | 6/2006 | Carlsson et al. |
| 7,063,465 B1 | 6/2006 | Wilkes et al. |
| 7,112,036 B2 | 9/2006 | Lubell et al. |
| 7,131,292 B2 | 11/2006 | Ikegami et al. |
| 7,144,226 B2 | 12/2006 | Pugnet et al. |
| 7,159,723 B2 | 1/2007 | Hilpert et al. |
| 7,160,518 B2 | 1/2007 | Chen et al. |
| 7,169,305 B2 | 1/2007 | Gomez |
| 7,185,447 B2 | 3/2007 | Arbeiter |
| 7,204,241 B2 | 4/2007 | Thompson |
| 7,240,583 B2 | 7/2007 | Wingett et al. |
| 7,241,392 B2 | 7/2007 | Maier |
| 7,244,111 B2 | 7/2007 | Suter et al. |
| 7,258,713 B2 | 8/2007 | Eubank et al. |
| 7,264,430 B2 | 9/2007 | Bischof et al. |
| 7,270,145 B2 | 9/2007 | Koezler |
| 7,288,202 B2 | 10/2007 | Maier |
| 7,314,560 B2 | 1/2008 | Yoshida et al. |
| 7,323,023 B2 | 1/2008 | Michele et al. |
| 7,328,749 B2 | 2/2008 | Reitz |
| 7,335,313 B2 | 2/2008 | Moya |
| 7,352,090 B2 | 4/2008 | Gustafson et al. |
| 7,367,713 B2 | 5/2008 | Swann et al. |
| 7,377,110 B2 | 5/2008 | Sheridan et al. |
| 7,381,235 B2 | 6/2008 | Koene et al. |
| 7,396,373 B2 | 7/2008 | Lagerstedt et al. |
| 7,399,412 B2 | 7/2008 | Keuschnigg |
| 7,403,392 B2 | 7/2008 | Attlesey et al. |
| 7,429,811 B2 | 9/2008 | Palazzolo et al. |
| 7,435,290 B2 | 10/2008 | Lane et al. |
| 7,445,653 B2 | 11/2008 | Trautmann et al. |
| 7,470,299 B2 | 12/2008 | Han et al. |
| 7,473,083 B2 | 1/2009 | Oh et al. |
| 7,479,171 B2 | 1/2009 | Cho et al. |
| 7,494,523 B2 | 2/2009 | Oh et al. |
| 7,501,002 B2 | 3/2009 | Han et al. |
| 7,517,155 B2 | 4/2009 | Stout et al. |
| 7,520,210 B2 | 4/2009 | Theodore, Jr. et al. |
| 7,575,422 B2 | 8/2009 | Bode et al. |
| 7,578,863 B2 | 8/2009 | Becker et al. |
| 7,591,882 B2 | 9/2009 | Harazim |
| 7,594,941 B2 | 9/2009 | Zheng et al. |
| 7,594,942 B2 | 9/2009 | Polderman |
| 7,610,955 B2 | 11/2009 | Irwin, Jr. |
| 7,628,836 B2 | 12/2009 | Baronet et al. |
| 7,637,699 B2 | 12/2009 | Albrecht |
| 7,674,377 B2 | 3/2010 | Crew |
| 7,677,308 B2 | 3/2010 | Kolle |
| 7,694,540 B2 | 4/2010 | Ishida et al. |
| 7,703,290 B2 | 4/2010 | Bladon et al. |
| 7,703,432 B2 | 4/2010 | Shaffer |
| 7,708,537 B2 | 5/2010 | Bhatia et al. |
| 7,708,808 B1 | 5/2010 | Heumann |
| 7,744,663 B2 | 6/2010 | Wallace |
| 7,748,079 B2 | 7/2010 | McDowell et al. |
| 7,766,989 B2 | 8/2010 | Lane et al. |
| 7,811,344 B1 | 10/2010 | Duke et al. |
| 7,811,347 B2 | 10/2010 | Carlsson et al. |
| 7,815,415 B2 | 10/2010 | Kanezawa et al. |
| 7,824,458 B2 | 11/2010 | Borgstrom et al. |
| 7,824,459 B2 | 11/2010 | Borgstrom et al. |
| 7,836,601 B2 | 11/2010 | El-Shafei |
| 7,846,228 B1 | 12/2010 | Saaski et al. |
| 7,850,427 B2 | 12/2010 | Peer et al. |
| 7,884,521 B2 | 2/2011 | Buhler et al. |
| 7,963,160 B2 | 6/2011 | Bisgaard |
| 8,006,544 B2 | 8/2011 | Holmes et al. |
| 8,061,970 B2 | 11/2011 | Maier et al. |
| 8,109,168 B2 | 2/2012 | Wurm et al. |
| 8,118,570 B2 | 2/2012 | Meacham et al. |
| 8,182,153 B2 | 5/2012 | Singh et al. |
| 8,191,410 B2 | 6/2012 | Hansen et al. |
| 8,283,825 B2 | 10/2012 | Maier |
| 8,353,633 B2 | 1/2013 | Griffin |
| 8,535,022 B2 | 9/2013 | Takei et al. |
| 2002/0009361 A1 | 1/2002 | Reichert et al. |
| 2002/0197150 A1 | 12/2002 | Urlichs |
| 2003/0029318 A1 | 2/2003 | Firey |
| 2003/0035718 A1 | 2/2003 | Langston et al. |
| 2003/0136094 A1 | 7/2003 | Illingworth et al. |
| 2003/0212476 A1 | 11/2003 | Aanen et al. |
| 2004/0007261 A1 | 1/2004 | Cornwell |
| 2004/0024565 A1 | 2/2004 | Yu et al. |
| 2004/0047526 A1 | 3/2004 | DeWachter et al. |
| 2004/0061500 A1 | 4/2004 | Lou et al. |
| 2004/0086376 A1 | 5/2004 | Baldassarre et al. |
| 2004/0101395 A1 | 5/2004 | Tong et al. |
| 2004/0117088 A1 | 6/2004 | Dilger |
| 2004/0170505 A1 | 9/2004 | Lenderink et al. |
| 2004/0179961 A1 | 9/2004 | Pugnet et al. |
| 2004/0189124 A1 | 9/2004 | Baudelocque et al. |
| 2005/0008271 A1 | 1/2005 | Lee |
| 2005/0106015 A1 | 5/2005 | Osgood |
| 2005/0173337 A1 | 8/2005 | Costinel |

(56) References Cited

U.S. PATENT DOCUMENTS

| | | |
|---|---|---|
| 2006/0065609 A1 | 3/2006 | Arthur |
| 2006/0090430 A1 | 5/2006 | Trautman et al. |
| 2006/0096933 A1 | 5/2006 | Maier |
| 2006/0140747 A1 | 6/2006 | Vandervort et al. |
| 2006/0157251 A1 | 7/2006 | Stinessen et al. |
| 2006/0157406 A1 | 7/2006 | Maier |
| 2006/0177166 A1 | 8/2006 | Stadlmayr et al. |
| 2006/0186671 A1 | 8/2006 | Honda et al. |
| 2006/0193728 A1 | 8/2006 | Lindsey et al. |
| 2006/0204153 A1 | 9/2006 | Alam et al. |
| 2006/0222515 A1 | 10/2006 | Delmotte et al. |
| 2006/0230933 A1 | 10/2006 | Harazim |
| 2006/0239831 A1 | 10/2006 | Garris, Jr. |
| 2006/0254659 A1 | 11/2006 | Bellott et al. |
| 2006/0275160 A1 | 12/2006 | Leu et al. |
| 2007/0029091 A1 | 2/2007 | Stinessen et al. |
| 2007/0036476 A1 | 2/2007 | Lane |
| 2007/0036646 A1 | 2/2007 | Nguyen et al. |
| 2007/0051245 A1 | 3/2007 | Yun |
| 2007/0051576 A1 | 3/2007 | Shimoda et al. |
| 2007/0062374 A1 | 3/2007 | Kolle |
| 2007/0065317 A1 | 3/2007 | Stock |
| 2007/0084340 A1 | 4/2007 | Dou et al. |
| 2007/0122265 A1 | 5/2007 | Ansari et al. |
| 2007/0140870 A1 | 6/2007 | Fukanuma et al. |
| 2007/0151922 A1 | 7/2007 | Mian |
| 2007/0163215 A1 | 7/2007 | Lagerstadt |
| 2007/0172363 A1 | 7/2007 | Laboube et al. |
| 2007/0196215 A1 | 8/2007 | Frosini et al. |
| 2007/0227969 A1 | 10/2007 | Dehaene et al. |
| 2007/0294986 A1 | 12/2007 | Beetz et al. |
| 2008/0031732 A1 | 2/2008 | Peer et al. |
| 2008/0039732 A9 | 2/2008 | Bowman |
| 2008/0095609 A1 | 4/2008 | Block et al. |
| 2008/0101918 A1 | 5/2008 | Block et al. |
| 2008/0101929 A1 | 5/2008 | Allen et al. |
| 2008/0115570 A1 | 5/2008 | Ante et al. |
| 2008/0116316 A1 | 5/2008 | Manfredotti et al. |
| 2008/0246281 A1 | 10/2008 | Agrawal et al. |
| 2008/0252162 A1 | 10/2008 | Post |
| 2008/0260539 A1 | 10/2008 | Stinessen et al. |
| 2008/0293503 A1 | 11/2008 | Vignal |
| 2008/0315812 A1 | 12/2008 | Balboul |
| 2008/0317584 A1 | 12/2008 | Murase et al. |
| 2009/0013658 A1 | 1/2009 | Borgstrom et al. |
| 2009/0015012 A1 | 1/2009 | Metzler et al. |
| 2009/0025562 A1 | 1/2009 | Hallgren et al. |
| 2009/0025563 A1 | 1/2009 | Borgstrom et al. |
| 2009/0046963 A1 | 2/2009 | Ozaki et al. |
| 2009/0151928 A1 | 6/2009 | Lawson |
| 2009/0159523 A1 | 6/2009 | McCutchen |
| 2009/0169407 A1 | 7/2009 | Yun |
| 2009/0173095 A1 | 7/2009 | Bhatia et al. |
| 2009/0173148 A1 | 7/2009 | Jensen |
| 2009/0266231 A1 | 10/2009 | Franzen et al. |
| 2009/0295244 A1 | 12/2009 | Ries |
| 2009/0302698 A1 | 12/2009 | Menz et al. |
| 2009/0304496 A1 | 12/2009 | Maier |
| 2009/0309439 A1 | 12/2009 | Yamamoto |
| 2009/0311089 A1 | 12/2009 | Begin et al. |
| 2009/0321343 A1 | 12/2009 | Maier |
| 2009/0324391 A1 | 12/2009 | Maier |
| 2010/0007133 A1 | 1/2010 | Maier |
| 2010/0007283 A1 | 1/2010 | Shimoyoshi et al. |
| 2010/0010701 A1 | 1/2010 | Gärtner |
| 2010/0021095 A1 | 1/2010 | Maier |
| 2010/0021292 A1 | 1/2010 | Maier et al. |
| 2010/0038309 A1 | 2/2010 | Maier |
| 2010/0043288 A1 | 2/2010 | Wallace |
| 2010/0043364 A1 | 2/2010 | Curien |
| 2010/0044966 A1 | 2/2010 | Majot et al. |
| 2010/0072121 A1 | 3/2010 | Maier |
| 2010/0074768 A1 | 3/2010 | Maier |
| 2010/0080686 A1 | 4/2010 | Teragaki |
| 2010/0083690 A1 | 4/2010 | Sato et al. |
| 2010/0090087 A1 | 4/2010 | Maier |
| 2010/0127589 A1 | 5/2010 | Kummeth |
| 2010/0129212 A1 | 5/2010 | Berger et al. |
| 2010/0139270 A1 | 6/2010 | Koch et al. |
| 2010/0143172 A1 | 6/2010 | Sato et al. |
| 2010/0163232 A1 | 7/2010 | Kolle |
| 2010/0180589 A1 | 7/2010 | Berger et al. |
| 2010/0183438 A1 | 7/2010 | Maier et al. |
| 2010/0239419 A1 | 9/2010 | Maier |
| 2010/0239437 A1 | 9/2010 | Maier et al. |
| 2010/0247299 A1 | 9/2010 | Maier |
| 2010/0257827 A1 | 10/2010 | Lane et al. |
| 2010/0310366 A1 | 12/2010 | Eguchi et al. |
| 2011/0017307 A1 | 1/2011 | Kidd et al. |
| 2011/0038716 A1 | 2/2011 | Frankenstein et al. |
| 2011/0044832 A1 | 2/2011 | Nijhuis |
| 2011/0052109 A1 | 3/2011 | Tecza et al. |
| 2011/0052432 A1 | 3/2011 | Cunningham et al. |
| 2011/0061536 A1 | 3/2011 | Maier et al. |
| 2011/0085752 A1 | 4/2011 | Tecza et al. |
| 2012/0106883 A1 | 5/2012 | Griffin |
| 2013/0015731 A1 | 1/2013 | Griffin et al. |

FOREIGN PATENT DOCUMENTS

| | | |
|---|---|---|
| DE | 692 17 540 T2 | 9/1997 |
| DE | 102 05 971 A1 | 11/2002 |
| EP | 1 300 600 A2 | 10/2002 |
| EP | 1 582 703 A2 | 10/2005 |
| EP | 0 875 694 B1 | 1/2006 |
| EP | 2 013 479 | 1/2009 |
| EP | 7838631.5 | 12/2009 |
| GB | 2 323 639 A | 9/1998 |
| GB | 2 337 561 A | 11/1999 |
| JP | 54099206 | 1/1978 |
| JP | H 02-96016 U | 7/1990 |
| JP | H 06-173948 A | 6/1994 |
| JP | 08-068501 A | 3/1996 |
| JP | 08-082397 | 3/1996 |
| JP | 8-284961 A | 11/1996 |
| JP | H 09-74736 A | 3/1997 |
| JP | 10-502722 | 3/1998 |
| JP | 2001-124062 A | 5/2001 |
| JP | 2002-106565 A | 4/2002 |
| JP | 2002-218708 A | 8/2002 |
| JP | 2002-242699 A | 8/2002 |
| JP | 2004-034017 A | 2/2004 |
| JP | 2004-340248 A | 12/2004 |
| JP | 2005-291202 A | 10/2005 |
| JP | 3711028 B2 | 10/2005 |
| JP | 2007-162726 A | 6/2007 |
| KR | 1019940702296 A | 7/1994 |
| KR | 10-1996-0065432 | 12/1996 |
| KR | 10-0207986 B1 | 7/1999 |
| KR | 10-2007-0106390 | 1/2007 |
| KR | 2009-0085521 A | 8/2009 |
| MX | 2008-012579 A | 12/2008 |
| WO | WO 95-13477 A1 | 5/1995 |
| WO | WO 95/24563 A1 | 9/1995 |
| WO | WO 01/17096 A1 | 3/2001 |
| WO | WO 01/57408 A1 | 8/2001 |
| WO | WO 2006/098806 A1 | 9/2006 |
| WO | WO 2012/166236 A1 | 12/2006 |
| WO | WO 2007/043889 A1 | 4/2007 |
| WO | WO 2007/047976 A1 | 4/2007 |
| WO | WO 2007/067169 A1 | 6/2007 |
| WO | WO 2007/103248 A2 | 9/2007 |
| WO | WO 2007/120506 A3 | 10/2007 |
| WO | WO 2008/036221 A3 | 3/2008 |
| WO | WO 2008/036394 A3 | 3/2008 |
| WO | WO 2008/039446 A3 | 4/2008 |
| WO | WO 2008/039491 A3 | 4/2008 |
| WO | WO 2008/039731 A3 | 4/2008 |
| WO | WO 2008/039732 A3 | 4/2008 |
| WO | WO 2008/039733 A2 | 4/2008 |
| WO | WO 2008/039734 A3 | 4/2008 |
| WO | WO 2009/111616 A3 | 9/2009 |
| WO | WO 2009/158252 A1 | 12/2009 |
| WO | WO 2009/158253 A1 | 12/2009 |

(56) References Cited

FOREIGN PATENT DOCUMENTS

| WO | WO 2010/083416 A1 | 7/2010 |
|----|-------------------|--------|
| WO | WO 2010/083427 A1 | 7/2010 |
| WO | WO 2010/107579 A1 | 9/2010 |
| WO | WO 2010/110992 A1 | 9/2010 |
| WO | WO 2011/034764 A2 | 3/2011 |
| WO | WO 2011/044423 A2 | 4/2011 |
| WO | WO 2011/044428 A2 | 4/2011 |
| WO | WO 2011/044430 A2 | 4/2011 |
| WO | WO 2011/044432 A2 | 4/2011 |
| WO | WO 2011/088004 A2 | 7/2011 |
| WO | WO 2012/030459 A1 | 3/2012 |
| WO | WO 2012/138545 A2 | 10/2012 |
| WO | WO 2012/158266 A2 | 11/2012 |

OTHER PUBLICATIONS

Atlas Bronze, "Graphite Lubricated Bearings," Website, 2 pages.
de Jongh, Frits, "The Synchronous Rotor Instability Phenomenon—Morton Effect," TurboCare B.V., Hengelo, The Netherlands, Proceedings of the 37th Turbomachinery Symposium, 2008, 9 pages.
Eichenberg, Dennis J., et al., "Development of a 32 Inch Diameter Levitated Ducted Fan Conceptual Design," (NASA/TM-2006-214481), *NASA, Glenn Research Center*, Cleveland, OH, Dec. 2006, 40 pages.
Liu, Kefu; Liu, Jie, and Liao, Liang, "Application of a Tunable Electromagnetic Damper in Suppression of Structural Vibration," (No. 04-CSME-49), *Department of Mechanical Engineering, Lakehead University*, Thunder Bay, Ontario Canada, received Oct. 2004, 21 pages.
Rodwell, E., "Auxiliary Bearings in Vertically Oriented Machines on Magnetic Bearings," (1003177), *EPRI*, Palo Alto, CA, 2001, 104 pages.
EP 03 00 9732—European Search Report, dated Sep. 9, 2003, ' page.
EP 05 000 410.0—European Search Report, dated Mar. 9, 2005, 5 pages.
EP 03 009 732.3—Communication Pursuant to Article 96(2), dated Mar. 15, 2005, 1 page.
EP 06 817 242—Extended Supplementary European Search Report, dated Aug. 7, 2009, 3 pages.
EP 06 817 242—Supplementary European Search Report, dated Aug. 25, 2009, 1 page.
PCT/US2006/041127—International Preliminary Report on Patentability, Written Opinion of the International Searching Authority, issued Apr. 30, 2008, 4 pages.
PCT/US06/41127—Written Opinion of the International Searching Authority, mailed Mar. 19, 2007, 3 pages.
PCT/US2007/008149—International Preliminary Report on Patentability, issued Sep. 30, 2008, 4 pages.
PCT/US2007/008149—Written Opinion of the International Searching Authority, mailed Jul. 17, 2008, 3 pages.
PCT/US2007/020101—International Preliminary Report on Patentability, issued Mar. 24, 2009, 8 pages.
PCT/US2007/020101—Written Opinion of the International Searching Authority, mailed Apr. 29, 2008, 7 pages.
PCT/US2007/020471—International Preliminary Report on Patentability, issued Mar. 24, 2009, 6 pages.
PCT/US2007/020471—Written Opinion of the International Searching Authority, mailed Apr. 1, 2008, 5 pages.
PCT/US2007/020659—International Preliminary Report on Patentability, issued Mar. 31, 2009, 4 pages.
PCT/US2007/020659—Written Opinion of the International Searching Authority, mailed Sep. 17, 2008, 3 pages.
PCT/US2007/020768—International Preliminary Report on Patentability, issued Mar. 31, 2009, 8 pages.
PCT/US2007/020768—Written Opinion of the International Searching Authority, mailed Mar. 3, 2008, 7 pages.
PCT/US2007/079348—International Preliminary Report on Patentability, issued Mar. 31, 2009, 5 pages.
PCT/US2007/079348—Written Opinion of the International Searching Authority, mailed Apr. 11, 2008, 4 pages.
PCT/US2007/079349—International Preliminary Report on Patentability, issued Mar. 31, 2009, 5 pages.
PCT/US2007/079349—Written Opinion of the International Searching Authority, mailed Apr. 2, 2008, 4 pages.
PCT/US2007/079350—International Preliminary Report on Patentability, issued Mar. 31, 2009, 6 pages.
PCT/US2007/079350—International Search Report, mailed Apr. 2, 2008, 1 page.
PCT/US2007/079350—Written Opinion of the International Searching Authority, mailed Apr. 2, 2008, 5 pages.
PCT/US2007/079352—International Preliminary Report on Patentability, issued Mar. 31, 2009, 4 pages.
PCT/US2007/079352—Written Opinion of the International Searching Authority, mailed Apr. 27, 2008, 3 pages.
PCT/US2009/036142—International Preliminary Report on Patentability, issued Sep. 7, 2010, 8 pages.
PCT/US2009/036142—Notification of Transmittal of International Search Report and Written Opinion of International Searching Authority, International Search Report, mailed May 11, 2009, 3 pages.
PCT/US2009/036142—Written Opinion of the International Searching Authority, mailed May 11, 2009, 7 pages.
PCT/US2009/047662—International Preliminary Report on Patentability, issued Jan. 5, 2011, 6 pages.
PCT/US2009/047662—Written Opinion of the International Searching Authority, mailed Aug. 20, 2009, 5 pages.
PCT/US2009/047667—International Report on Patentability, issued Jan. 5, 2011, 5 pages.
PCT/US2009/047667—Written Opinion of the International Searching Authority, mailed Aug. 7, 2009, 4 pages.
PCT/US2009/047667—Notification of Transmittal of International Search Report and Written Opinion of the International Searching Authority, International Search Report, mailed Aug. 7, 2009, 3 pages.
PCT/US2010/021199—Notification of Transmittal of International Search Report and Written Opinion of International Searching Authority, International Search Report, Written Opinion of the International Searching Authority, mailed Mar. 22, 2010, 6 pages.
PCT/US2010/021199—International Preliminary Report on Patentability, issued Feb. 7, 2011, 10 pages.
PCT/US2010/021218—Notification of Transmittal of International Search Report and Written Opinion of International Searching Authority, International Search Report, Written Opinion of the International Searching Authority, mailed Mar. 23, 2010, 7 pages.
PCT/US2010/021218—International Report on Patentability, issued Jan. 26, 2011, 7 pages.
PCT/US2010/025650—Notification of Transmittal of International Search Report and Written Opinion of the International Searching Authority, International Search Report, Written Opinion of the International Searching Authority, mailed Apr. 22, 2010, 8 pages.
PCT/US2010/025650—International Report on Patentability, issued Mar. 3, 2011, 8 pages.
PCT/US2010/025952—Notification of Transmittal of International Search Report and Written Opinion of the International Searching Authority, International Search Report, Written Opinion of the International Searching Authority, mailed Apr. 12, 2010, 8 pages.
PCT/US2010/025952—International Report on Patentability, issued Mar. 4, 2011, 8 pages.
PCT/US2010/051922—Notification of Transmittal of International Search Report and Written Opinion of the International Searching Authority, International Search Report, Written Opinion of the International Searching Authority, mailed Jun. 30, 2011, 8 pages.
PCT/US2010/051927—Notification of Transmittal of International Search Report and Written Opinion of the International Searching Authority, International Search Report, Written Opinion of the International Searching Authority, mailed Jun. 30, 2011, 8 pages.
PCT/US2010/051930—Notification of Transmittal of International Search Report and Written Opinion of the International Searching Authority, International Search Report, Written Opinion of the International Searching Authority, mailed Jun. 30, 2011, 8 pages.
PCT/US2010/051932—Notification of Transmittal of International Search Report and Written Opinion of the International Searching Authority, International Search Report, Written Opinion of the International Searching Authority, mailed Jun. 30, 2011, 8 pages.

(56) References Cited

OTHER PUBLICATIONS

PCT/US2011/020746—Notification of Transmittal of International Search Report and Written Opinion of the International Searching Authority, International Search Report, Written Opinion of the International Searching Authority, mailed Sep. 23, 2011, 8 pages.
PCT/US2011/046045—Notification of Transmittal of International Search Report and Written Opinion of the International Searching Authority, International Search Report, Written Opinion of the International Searching Authority, mailed Feb. 17, 2012, 10 pages.
PCT/US2011/045987—Notification of Transmittal of International Search Report and Written Opinion of the International Searching Authority, International Search Report, Written Opinion of the International Searching Authority, mailed Mar. 21, 2012, 10 pages.
PCT/US2012/031237—International Search Report, Written Opinion of the International Searching Authority, mailed Nov. 1, 2012, 6 pages.
PCT/US2012/031240—Notification of Transmittal of International Search Report and Written Opinion of the International Searching Authority, International Search Report, Written Opinion of the International Searching Authority, mailed Oct. 19, 2012, 8 pages.
PCT/US2012/031345—International Search Report and Written Opinion mailed Oct. 31, 2012 (11 pages).
PCT/US2012/031345—International Preliminary Report on Patentability mailed May 20, 2013 (16 pages).

SEGMENTED COAST-DOWN BEARING FOR MAGNETIC BEARING SYSTEMS

The present application is a national stage application of PCT Pat. App. No. PCT/US2012/031345, filed Mar. 30, 2012, which claims priority to U.S. Patent Application Ser. No. 61/490,897, which was filed May 27, 2011. These priority applications are hereby incorporated by reference in their entirety into the present application, to the extent that these priority applications are not inconsistent with the present application.

BACKGROUND

Magnetic bearings support a shaft by magnetic levitation, generally without physical contact, thereby eliminating mechanical wear and exhibiting low friction. One disadvantage to magnetic bearings, however, is that magnetic bearings can drop the shaft during shutdown or failure. If the shaft bottoms out during such a drop event and contacts the magnetic bearings, the magnetic bearings and/or other components coupled to or disposed proximal the shaft can sustain significant damage. To avoid such damage, magnetic bearing systems employ one or more coast-down bearings, also known as auxiliary, backup, secondary, or catcher bearings or bushings. Coast-down bearings are designed to support the shaft while the shaft is slowing down (i.e., coasting down) in the event the primary magnetic bearing drops the shaft. This prevents the shaft from impacting and damaging the magnetic bearings.

Coast-down bearings generally leave a clearance between the bearing and the shaft. During normal operation, the magnetic bearings support the shaft and hold it within this clearance such that the shaft rarely, if ever, touches the coast-down bearing; thus, the coast-down bearing is typically stationary with respect to the shaft during such normal operation. When the magnetic bearing system fails or shuts down, the shaft is caught and/or supported by the coast-down bearing.

To provide the clearance between the bearing and the shaft, however, the coast-down bearing is generally required to have an inside radius that is larger than the outside radius of the shaft disposed therein. Due to the shaft radius being smaller than the coast-down bearing radius, when the shaft is dropped or otherwise comes into contact with the coast-down bearing, the shaft is received along a narrow contact area, generally along an axial line of the coast-down bearing. This small contact area maximizes contact stresses between the shaft and the coast-down bearing, and also promotes whirl during the coast-down. Such maximized contact stresses greatly diminish the useful life of the coast-down bearing and, accordingly, increase the maintenance requirements of the system.

What is needed is a coast-down bearing that minimizes contact stresses during a magnetic bearing failure, shut down, or other drop event, thereby increasing the useful life of the coast-down bearing.

SUMMARY

Embodiments of the disclosure may provide an exemplary coast-down bearing for use with a magnetic bearing system. The coast-down bearing includes a plurality of segments each having a radius of curvature equal to an outer radius of a shaft and spaced radially therefrom to define a clearance, with the plurality of segments being configured to receive the shaft when a magnetic bearing drops the shaft. The coast-down bearing also includes a plurality of slots disposed between adjacent ones of the plurality of segments.

Embodiments of the disclosure may also provide an exemplary apparatus for supporting a shaft during a coast-down. The apparatus includes a first coast-down bearing including first and second segments each disposed around the shaft, radially-offset therefrom, and defining a first clearance therebetween. The first and second segments define a slot therebetween and each defines a radius of curvature that is equal to an outer radius of the shaft. The first and second segments are each configured to receive the shaft during the coast-down.

Embodiments of the disclosure may also provide an exemplary method for supporting a shaft during coast-down. The method includes receiving the shaft with at least one of a plurality of bearing segments of a coast-down bearing after the shaft has been dropped by a magnetic bearing, to cause an initial impact on a bearing surface of the at least one of the plurality of bearing segments. The plurality of bearing segments are disposed around the shaft and spaced radially apart therefrom by a clearance. Further, each of the plurality of bearing segments has a radius of curvature substantially equal to an outer radius of the shaft. The method may also include distributing the initial impact over the at least one of the plurality of bearing segments by contacting the shaft with substantially all of the bearing surface of the at least one of the plurality of bearing segments.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
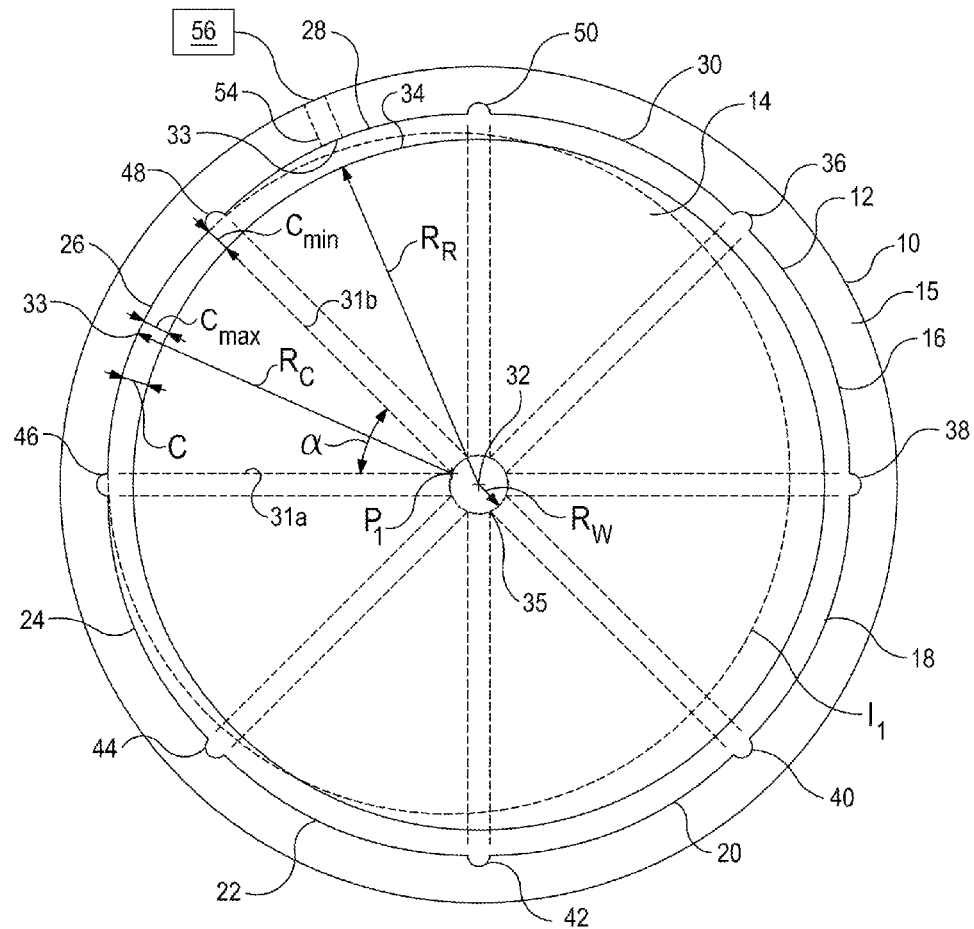
FIG. 1 illustrates a schematic axial end view of an exemplary coast-down bearing, in accordance with one or more aspects of the disclosure.

It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein.

FIG. 1 illustrates a schematic axial end view of a coast-down bearing 10, according to one or more embodiments. In general, the coast-down bearing 10 includes a body or shell 15, which defines a bore 12 for receiving a shaft 14. The coast-down bearing 10 and the shaft 14 are generally concentric during normal operation, defining a common nominal center 32. Further, the bore 12 is sized to provide a clearance C between the coast-down bearing 10 and the shaft 14. The bore 12 is generally defined by segments 16, 18, 20, 22, 24, 26, 28, and 30 (hereinafter referred to as "segments 16-30"), which are circumferentially separated by slots 36, 38, 40, 42, 44, 46, 48, 50, (hereinafter referred to as "slots 36-50"). Although described in greater detail below, the segments 16-30 may each be thought of as an arc of a separate, theoretical circle, for example, circle $I_1$ as shown for segment 26. For the sake of clarity of FIG. 1, only theoretical circle $I_1$ is shown in FIG. 1. It will be appreciated, however, that the theoretical circles defining each of the other segments 16-24, 28, 30 may be substantially similar. The circle $I_1$ has a radius, which defines a radius of curvature $R_C$ for the segment 26 and is substantially equal (i.e., generally within a standard range of manufacturing tolerances) in magnitude to the radius of the shaft $R_R$. The circle $I_1$ is, however, eccentric with respect to the shaft 14 during normal operation, such that segment 26 is spaced radially apart from the shaft 14 to provide the running clearance C. Indeed, it will be appreciated that the radius of curvature $R_C$ for segment 26 may be less than the distance from the nominal center 32 to each segment 26.

During a drop event, the radial position of the shaft 14 shifts such that the shaft 14 is no longer centered at the nominal center 32. Further, the shaft 14 shifts until it becomes concentric with one of the theoretical circles, for example, circle $I_1$. As the shaft 14 radius $R_R$ and the radius $R_C$ of the circle $I_1$ are equal in magnitude, when the shaft 14 is concentric with the circle $I_1$, the shaft 14 engages the segment 26 along all or substantially all of the surface area of the segment 26. Subsequently, forces caused by the rotation and vibration of the shaft 14 against the segment 26 propel the shaft 14 to impact another one of the segments 16-24, 28, 30. However, as each of the segments 16-30 may be similarly defined as described for segment 26, for each impact, the load applied by the weight, rotation, vibration, etc. of the shaft 14 is distributed over all or substantially all of the surface area of the one of the segments 16-30, rather than at a single point or line as with traditional coast-down bearings. This enhanced distribution of the dynamic loading on the coast-down bearing 10 reduces surface damage and thereby increases the useful life thereof.

Turning to the illustrated embodiment now in greater detail, the coast-down bearing 10 may be configured for use in conjunction with a magnetic bearing system including one or more primary magnetic bearings (not shown) that support the shaft 14 during normal operation. In various embodiments, the shell 15 of the coast-down bearing 10 may be unitary or may be split into about 45 degree, 90 degree, 180 degree or other size arcuate sections (not shown), which are configured to fasten or otherwise couple together and fit 360 degrees around the shaft 14. The shell 15 and the shaft 14 may be generally concentric, defining a common nominal center 32 during normal operation.

The segments 16-30 at least partially define the bore 12 and each provides a bearing contact surface for the bearing 10. It will be appreciated that the coast-down bearing 10 may include any number of segments, for example, between about 5 and about 10, about 6 and about 11, about 7 and about 12 segments, or more. Each of the segments 16-30 defines a radius of curvature $R_C$, which, as noted above, is substantially equal to an outer radius $R_R$ of the shaft 14 and is less than the distance from the nominal center 32 to the segments 16-30. Accordingly, the radius of curvature $R_C$ of one or more of the segments 16-30 is generally not centered on the nominal center 32, but instead is centered at a point offset therefrom, for example, a locus point $P_1$.

The aforementioned slots 36-50 positioned circumferentially between the segments 16-30 may be formed using milling techniques, electron discharge machining, combinations thereof, or the like. In one or more embodiments, the slots 36-50 may be hemispherical as shown, but may also be square, tapered, or take any desired shape. Further, the slots 16-30 may extend axially through the entire shell 15, but in other embodiments may only span part of the axial length of the shell 15. In some embodiments, however, the coast-down bearing 10 may be fabricated by connecting the segments 16-30 to the shell 15, while leaving the slots 36-50 therebetween. Various other fabrication processes and techniques are contemplated and may be employed without departing from the scope of this disclosure.

A whirl circle 35 on which the locus point $P_1$ for the segment 26 may reside, as shown, and on which locus points (not shown) for the remaining segments 16-24, 28, 30 may reside, may be generally concentric with the shaft 14 and spaced radially from the common nominal center 32 by a whirl radius $R_W$. The whirl radius $R_W$ may be equal to a maximum clearance $C_{max}$, which may be defined at or proximal the mid-span 33 of each of the segments 16-30. In this context, proximal is intended to mean less than about 10% of the circumferential length of one of the segments 16-30. In contrast, the minimum clearance $C_{min}$ may be defined proximal one or both of the circumferential extents of each of the segments 16-30 where the segments 16-30 meet the slots 36-50. Although the difference in the magnitudes of $C_{max}$ and $C_{min}$ are not easily viewable in FIG. 1, it will be appreciated that if segment 26 were to extend farther along circle the minimum clearance $C_{min}$ would converge to zero as circle $I_1$ intersects the shaft 14, while the maximum clearance $C_{max}$ remains constant; thus, the point on the segment 26 circumferentially farthest from the mid-span 33 may define the minimum clearance $C_{min}$ from the shaft 14.

As indicated for segment 26, lines 31a and 31b may be drawn from where the segment 26 meets the slots 46, 48, respectively. The lines 31a,b converge at the locus point $P_1$ to define an angle α therebetween, providing the angular reference for the arc-length of the segment 26. As also shown, such lines may be drawn for each of the segments 16-30 where they meet the corresponding slots 36-50. In various embodiments, the angle α may be from about 10 degrees to about 120 degrees, and may be uniform or may vary for each of the segments 16-30.

Proceeding around the bore 12, the slots 36-50 serve to account for the radius of curvature $R_C$ of the segments 16-30 being less than the distance from the center 32 to the bore 12. Accordingly, the bore 12 maintains at least the minimum clearance $C_{min}$ from the shaft 14 during normal operation. Although not shown, in one or more embodiments, some of the segments 16-30 may deviate from having the radius of curvature $R_C$ substantially equal to the radius of the shaft $R_R$ and may instead have a radius of curvature equal to the radius of the shaft $R_R$ plus the whirl radius $R_W$, for example, without departing from the scope of this disclosure.

Additionally, one or more of the segments 16-30 (as shown, segment 28) may include a port 54. The port 54 may extend through the segment 28 proximal the mid-span 33 thereof, for example, and may be in fluid communication with a source of lubricant or hydraulic fluid 56. Such lubricant may be dry (i.e., fine powder or granular in consistency) or liquid but not necessarily under pressure. On the other hand, such hydraulic fluid may be provided under pressure. If the hydraulic pressure is high, such as with hydrostatic bearings, the force acting on the shaft 14 may be sufficient to push the shaft 14 radially toward the nominal center 32. The source of lubricant and/or hydraulic fluid 56 may provide lubricant and/or hydraulic fluid to the clearance C, for example, during a drop event, thereby reducing friction and/or providing hydrostatic lift to reduce impact load. In an embodiment where hydraulic fluid is provided, the hydraulic fluid may be process fluid from the turbomachine (not shown), or any other suitable fluid.

In one or more embodiments, two coast-down bearings 10 may be advantageously employed to receive a single shaft 14. For example, the two coast-down bearings 10 may be coaxially aligned around the shaft 14 and "clocked" relative to each other, such that the slots 36-50 of one coast-down bearing 10 are aligned with the segments 16-30 of the other coast-down bearing 10. In one embodiment, the slots 36-50 of each coast-down bearing 10 may be aligned with the mid-span 33 of the segments 16-30 of the other.

In exemplary operation of the coast-down bearing 10, when the primary magnetic radial bearing (not shown) fails to support the shaft 14, the coast-down bearing 10 catches the shaft 14, thereby preventing the shaft 14 from bottoming out against and damaging the magnetic radial bearing. Accordingly, at the beginning of the coast-down, the shaft 14 may continue to operate at high speed, for example, slowly reducing from about 10,000 RPM or more, although higher and lower speeds are also contemplated herein. The coast-down bearing 10 may be configured to remain stationary when the shaft 14 is dropped, but in other embodiments may be configured to rotate in response to contact with the rotating shaft 14. For example, the coast-down bearing 10 may slide against a housing (not shown) in which it is mounted, using anti-friction coatings to facilitate such sliding, for example. In some embodiments, other anti-friction devices, such as rolling element bearings may be used to reduce friction between the shell 15 and the housing supporting the coast-down bearing 10.

During the drop event, the shaft 14 may tend to orbit around the bore 12 of the coast-down bearing 10, generally known as whirling, such that the shaft 14 consecutively impacts the different segments 16-30. The greater surface area of contact between the shaft 14 and the coast-down bearing 10 provided by the segments 16-30, however, distributes the load incident on the coast-down bearing 10 from these impacts over a relatively large percentage of the segments 16-30. Accordingly, with the force provided by the weight and rotation of the shaft 14 distributed over a greater area, the impact with the shaft 14 applies a reduced contact pressure on the coast-down bearing 10, in comparison to coast-down bearings that receive the shaft 14 on a single line (not shown). For example, the shaft 14 may contact the segments 16-30 across more than about 50%, more than about 60%, more than about 70%, more than about 80%, more than about 90%, or more than about 95% of a surface area of each segment 16-30.

Figure 2:
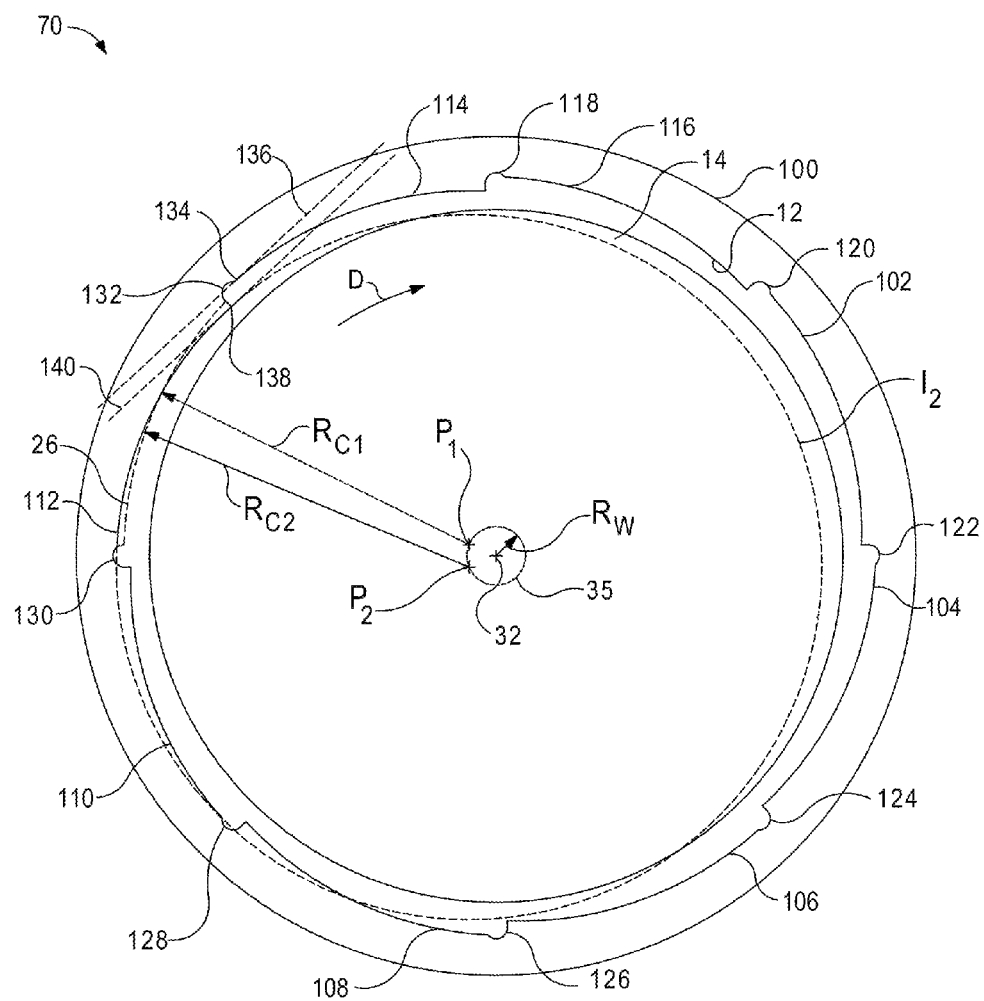
FIG. 2 illustrates a schematic axial end view of another exemplary coast-down bearing, in accordance with one or more aspects of the disclosure.

FIG. 2 illustrates an axial end view of another coast-down bearing 100, according to one or more embodiments. The coast-down bearing 100 may have a similar structure and operation as the coast-down bearing 10 and may best be understood with reference thereto, with like numbers representing like elements. The coast down bearing 100 includes segments 102, 104, 106, 108, 110, 112, 114, 116 (hereinafter referred to as segments 102-116), and slots 118, 120, 122, 124, 126, 128, 130, 132 (hereinafter referred to as slots 118-132), which may be generally similar in construction to the segments 16-30 and slots 36-50, respectively, shown in and described above with reference to FIG. 1. However, the segments 102-116 may be rotated or "tilted" to provide a smooth transition for the shaft 14 as it orbits or whirls within the coast-down bearing 10 during coast-down. It will be appreciated that in the illustration provided by FIG. 2, the tilting of the segments 102-116 may be greatly exaggerated so that the tilting can be easily viewed.

The un-tilted segment 26 of FIG. 1 is illustrated in FIG. 2 in phantom, for comparison to the tilted segment 112. As shown, the segment 26 has a radius of curvature $R_{C1}$ centered on locus point $P_1$, while the tilted segment 112 has a radius of curvature $R_{C2}$ centered on locus point $P_2$. Further, the theoretical circle defining the segment 26 in FIG. 1 has been moved and is shown as circle $I_2$ in FIG. 2. The circle $I_2$ is centered on locus point $P_2$, rather than locus point $P_1$, thus providing the tilting. Accordingly, the radii of curvature $R_{C1}$ and $R_{C2}$, although extending from different locus points $P_1$ and $P_2$, respectively, may remain substantially equal in length.

One or more of the segments 102-116 may be tilted in a direction opposing a direction of rotation D of the shaft 14, as shown. Tilting the segments 102-116 shifts the locus point $P_2$ thereof in the same direction around the circle 35 from locus point $P_1$. In various exemplary embodiments, the locus point $P_2$ may be shifted around the whirl circle 35 from locus point $P_1$ by less than about 1, about 1, about 2, about 5, about 7, about 10, or more degrees counterclockwise (i.e., against the direction D of rotation, as shown); however, in other embodiments, the tilting may be reversed, shifting the locus point $P_2$ from the locus point $P_1$ clockwise (i.e., with the direction D of rotation).

The segment 114 has a leading edge 134 adjacent the slot 132 and defines a tangent line 136, which is tangent to the segment 114 at the leading edge 134. The segment 112 has a trailing edge 138, which is also adjacent the slot 132, but defines the other circumferential side thereof. The segment 112 defines a tangent line 140 at the trailing edge 138. In an exemplary embodiment, the segments 112, 114 are tilted such that their tangent lines 136, 140 are generally parallel.

Accordingly, as the shaft 14 orbits (whirls) in the coast-down bearing 100, the shaft 14 is smoothly transitioned from contact with the segment 112 to the segment 114. In at least one embodiment, all of the segments 102-116 may be tilted in this fashion thereby providing a smooth, progressive transition to each segment 102-116 as the shaft 14 rotates.

In various embodiments, the coast-down bearing 100 may include a combination of one or more of the un-tilted segments 16-30 (FIG. 1) and one or more of the tilted segments 102-116 (FIG. 2). Additionally, although not shown, the coast-down bearing 100 may include a port coupled to a source of lubricant and/or hydraulic fluid (not shown), as described above with reference to coast-down bearing 10 of FIG. 1.

Referring now to FIGS. 1 and 2, in various embodiments, combinations of the coast-down bearings 10, 100 may be advantageously employed. For example, the tilted coast-down bearing 100 may be stacked axially between and proximal two of the coast-down bearings 10. In such embodiments, axially-adjacent coast-down bearings 10 and/or 100 may be clocked relative each other, such that the slots 36-50 or 118-132 of one are axially aligned with the segments 16-30 or 118-132 of the other. Furthermore, in various embodiments, the coast-down bearings 10 and/or 100 may be stationary with respect to the shaft 14; however, in other embodiments, the coast-down bearings 10 and/or 100 may be free-rotating, such that, when the shaft 14 is supported on the coast-down bearings 10 and/or 100, the coast-down bearings 10 and/or 100 rotate therewith, for example, at a fraction of the rotational speed of the shaft 14.

Figure 3:
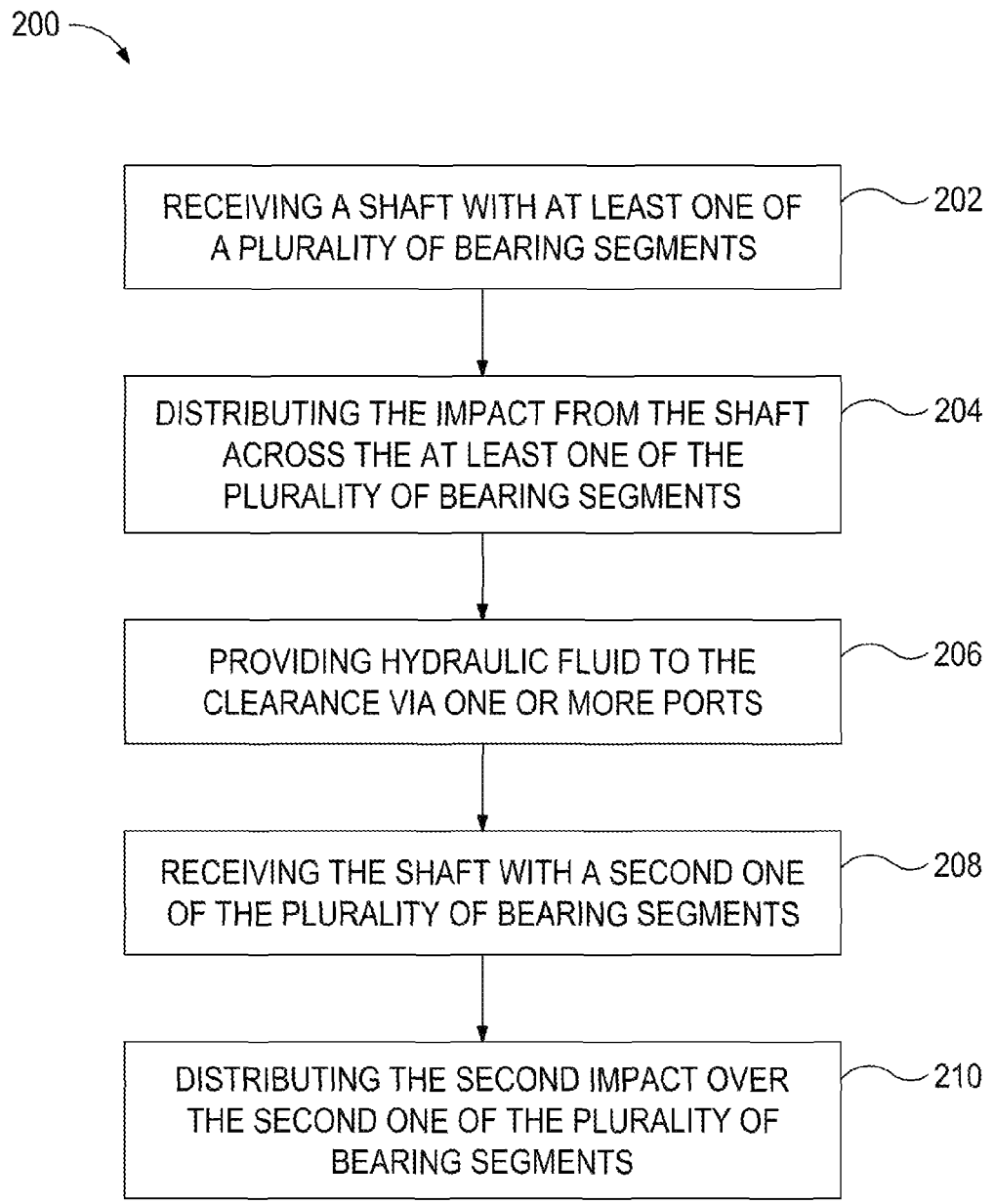
FIG. 3 illustrates a flowchart of an exemplary method for catching a shaft, in accordance with one or more aspects of the disclosure.

FIG. 3 illustrates a flowchart of a method 200 for supporting a shaft during coast-down. The method 200 may proceed by operation of one or more of the coast-down bearings 10 and/or 100 described above; therefore, method 200 may be best understood with reference thereto. The method 200 may include receiving the shaft with at least one of a plurality of bearing segments of a coast-down bearing after the shaft has been dropped by a magnetic bearing, as at 202, which may cause an initial impact on the bearing surface. In various embodiments, the plurality of bearing segments may be disposed around the shaft and spaced radially apart therefrom by a clearance. Further, each of the plurality of bearing segments may have a radius of curvature substantially equal to an outer radius of the shaft.

The method 200 may also include distributing the initial impact over the at least one of the plurality of bearing segments by contacting the shaft with substantially all of the bearing surface of at least one of the plurality of bearing segments, as at 204. Further, the method 200 may include providing lubricant or hydraulic fluid to the clearance via one or more ports, each of the one or more ports being defined in the one or more segments, as at 206. Additionally, the method 200 may include receiving the shaft with a second one of the plurality of bearing segments after the initial impact to cause a second impact, as at 208. The method 200 may then proceed to distributing the second impact over the second one of the plurality of bearing segments by contacting the shaft with substantially all of the bearing surface of another at least one of the plurality of bearing segments, as at 210. In one or more embodiments, the method 200 may also include tilting the plurality of bearing segments such that the plurality of bearing segments each face in a direction opposite to a direction of rotation of the shaft.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

We claim:

1. A coast-down bearing for use with a magnetic bearing system, comprising:
   a plurality of segments each having a radius of curvature substantially equal to an outer radius of a shaft, spaced radially therefrom, and defining a clearance between the plurality of segments and the shaft, the plurality of segments being configured to receive the shaft when a magnetic bearing drops the shaft, and at least one of the plurality of segments being tilted; and
   a plurality of slots disposed between adjacent ones of the plurality of segments.

2. The coast-down bearing of claim 1, wherein the clearance defines a maximum clearance proximal a mid-span of each of the plurality of segments and a minimum clearance being defined proximal at least one of a leading edge and a trailing edge of each of the plurality of segments.

3. The coast-down bearing of claim 1, wherein the at least one of the plurality of segments is tilted such that the at least one of the plurality of segments faces a circumferential direction opposite to a circumferential direction in which the shaft rotates.

4. The coast-down bearing of claim 1, wherein at least one of the plurality of segments defines a port extending radially therethrough and in fluid communication with a source of lubricant, hydraulic fluid, or both, and the clearance between the shaft and the plurality of segments.

5. The coast-down bearing of claim 1, further comprising a unitary body providing the plurality of segments and into which the plurality of slots are formed.

6. An apparatus for supporting a shaft during a coast-down, comprising a first coast-down bearing including first and second segments each disposed around the shaft, radially-offset therefrom, and defining a first clearance therebetween, the first and second segments defining a slot therebetween and each defining a radius of curvature that is substantially equal to an outer radius of the shaft, the first and second segments each being configured to receive the shaft during the coast-down, and at least one of the first and second segments being tilted.

7. The apparatus of claim 6, wherein the radius of curvature of at least one of the first and second segments extends from a locus that is offset from a center of the first coast-down bearing.

8. The apparatus of claim 7, wherein the first clearance between the shaft and the at least one of the first and second segments is at a minimum proximal the slot, and at a maximum proximal a mid-span of the at least one of the first and second segments.

9. The apparatus of claim 8, wherein the locus is radially-offset from the center by a distance that is substantially equal to the maximum clearance.

10. The apparatus of claim 6, wherein at least one of the first and second segments defines a port extending radially therethrough, the port being in fluid communication with the first clearance and with a source of lubricant, hydraulic fluid, or both.

11. The apparatus of claim 6, wherein the slot is substantially hemispherical in axial-cross section and the first coast-down bearing is unitary.

12. The apparatus of claim 6, further comprising a second coast-down bearing coaxially aligned with the first coast-down bearing and axially adjacent thereto, the second coast-down bearing comprising:
   third and fourth segments disposed around the shaft and radially separated therefrom by a second clearance; and
   a second slot defined by the third and fourth segments and disposed therebetween.

13. The apparatus of claim 12, wherein the second slot is axially-aligned with the first or second segment.

14. The apparatus of claim 13, wherein the second slot is axially-aligned with a mid-span of the first or second segment.

15. A method for supporting a shaft during coast-down, comprising:
   receiving the shaft with at least one of a plurality of bearing segments of a coast-down bearing after the shaft has been dropped by a magnetic bearing, to cause an initial impact on a bearing surface of the at least one of the plurality of bearing segments, the plurality of bearing segments being disposed around the shaft and spaced radially apart therefrom by a clearance, each of the plurality of bearing segments having a radius of curvature substantially equal to an outer radius of the shaft;
   distributing the initial impact over the at least one of the plurality of bearing segments by contacting the shaft with substantially all of the bearing surface of the at least one of the plurality of bearing segments; and
   tilting the plurality of bearing segments such that the plurality of bearing segments each face in a direction opposite to a direction of rotation of the shaft.

16. The method of claim 15, further comprising providing lubricant, hydraulic fluid, or both to the clearance via one or more ports, each of the one or more ports being defined in the at least one of the plurality of bearing segments.

17. The method of claim 15, further comprising:
   receiving the shaft with another one of the at least one of the plurality of bearing segments after the initial impact to cause a second impact; and
   distributing the second impact over the another one of the at least one of the plurality of bearing segments by contacting the shaft with substantially all of a bearing surface of the another one of the least one of the plurality of bearing segments.

* * * * *